No. 718,244. PATENTED JAN. 13, 1903.
L. COMBRUN.
SUPPORTING SHOE FOR VEHICLES WITH AIR TIRES.
APPLICATION FILED AUG. 25, 1902.
NO MODEL.

Witnesses
S. Brashears

Inventor
Leon Combrun

UNITED STATES PATENT OFFICE.

LEON COMBRUN, OF CLICHY-ON-THE-SEINE, FRANCE.

SUPPORTING-SHOE FOR VEHICLES WITH AIR-TIRES.

SPECIFICATION forming part of Letters Patent No. 718,244, dated January 13, 1903.

Application filed August 25, 1902. Serial No. 120,993. (No model.)

*To all whom it may concern:*

Be it known that I, LEON COMBRUN, a citizen of the Republic of France, residing at Clichy-on-the-Seine, France, have invented a Supporting-Shoe for Vehicles with Air-Tires, of which the following is a specification.

The present invention relates to a supporting-shoe for vehicles having pneumatic air-tires, by means of which the wheels of said vehicles may be lifted up and supported off the ground.

The supporting-shoe can be attached to the felly of the wheel to be lifted up, either in front or in the rear of the point of its contact with the floor, so that it will only be necessary to move the vehicle forward or backward to cause the lifting up of the wheel by shifting the shoe under the hub and to maintain the wheel in the lifted-up position as long as the device remains directly under the axle of the wheel.

In the annexed drawing the improved supporting-shoe is illustrated by way of an example.

Figure 1:
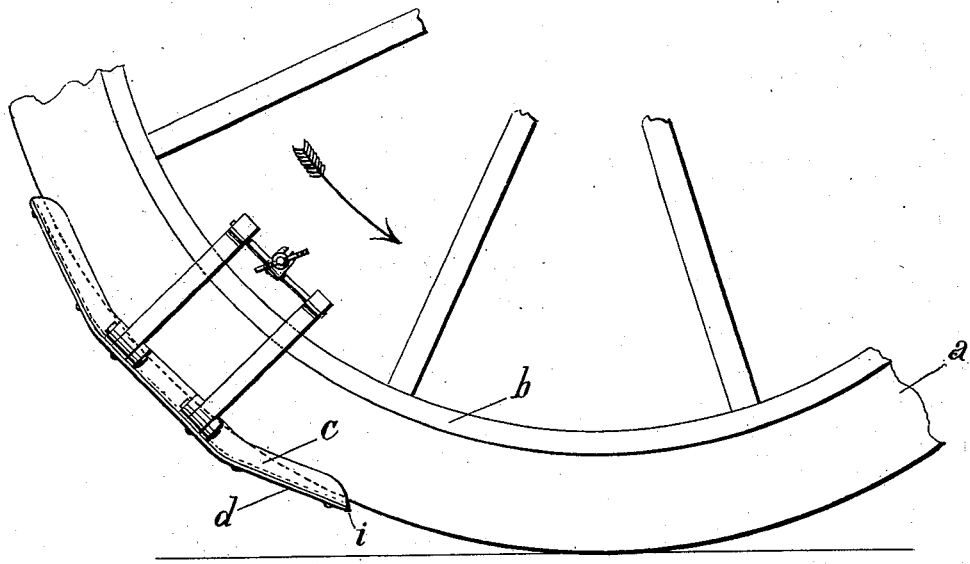
Figure 2:
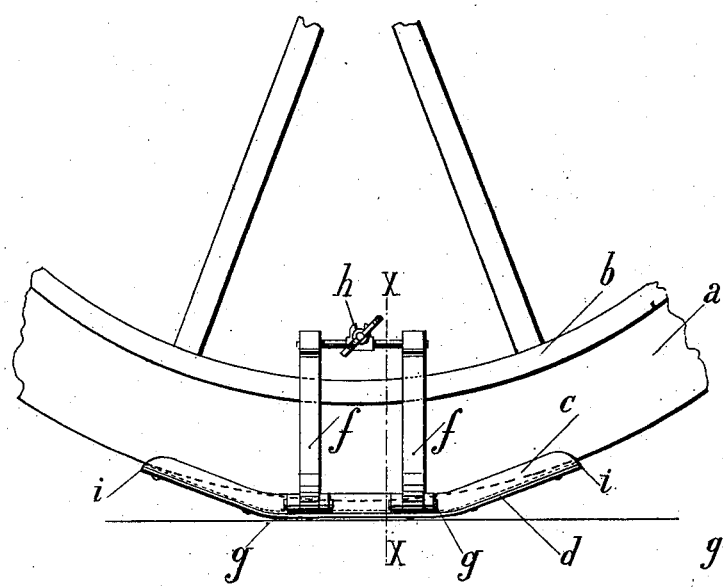
Figure 3:
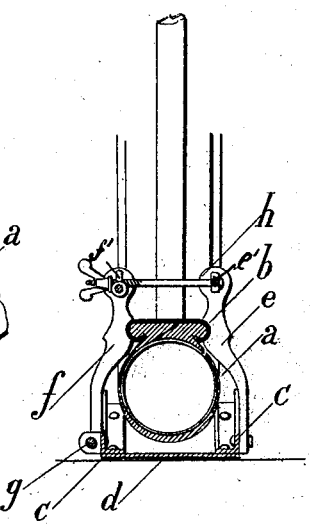

Figure 1 is a side view of a wheel, the device being clamped to the felly in front of a line drawn vertically from the hub to the floor. Fig. 2 is a similar view, the device being located directly under the axle. Fig. 3 is a section on line X X in Fig. 2.

*a* is a pneumatic tire secured to the rim *b*. The shoe consists of two angle-irons *c*, connected at their lower part by a plate *d* or a number of cross-bars. At each side and outside of the angle-irons are provided the arms *e e* and *f f*, the arms *e e* being rigidly secured to one of the angle-irons by rivets or bolts, while the arms *f* are pivoted to the opposite angle-iron, as at *g*. These arms have a profile corresponding to the edge of the rim, so that when turned upward they engage partly the side of the rim.

The upper ends of the arms *e e* are connected by a bar *e'*, having an eye in the middle, and a similar bar *f'* connects the arms *f f*, having in the middle a fork or an eye cut open at the top. A screw-bolt *h* passes loosely through the eye of bar *e'*, and the threaded end being provided with a thumb-nut is adapted to rest in the fork or open eye of bar *f'*.

The angle-irons are so curved that when the device is clamped to the felly there is only a very small space—viz., one millimeter—between the tire and the end edges *i* of the device, but yet large enough so that the tire does not come in contact therewith, whereas this space is preferably made larger in the middle of the device—viz., from five to fifteen millimeters.

The described device is used in the following manner: The shoe is placed upon the wheel so that the profiled arms *e e* and *f f* grip the rim of the wheel. Then the bolt *h* is placed in its bearing on the bar *f'* and the nut is turned tight, thereby forcing the head of the bolt against the eye of bar *e'*. In this manner the shoe is securely clamped to the wheel without touching in any way the pneumatic tire. Now the wheel is caused to turn, by pulling the vehicle forward, (respectively backward). The wheel is thus lifted up from the ground and kept in this position by the shoe. The lifting up will be effected without any shock and automatically, and in supporting the wheel there is no other gripping-point on the rim of the wheel.

The pumping up of the tire is effected very easily, since the tire does not rest at any point on a support adapted to flatten or to deform it.

I claim—

A supporting-shoe for vehicles with pneumatic tires composed of two angle-irons *c* and a connecting-plate *d* bearing on the ground and having lateral arms *e e*, *f f*, one pair of which is rigidly secured to one of the angle-irons the other pair being pivoted to the opposite angle-iron, each arm being provided with a profile to fit the sides or edges of the rim and being provided with means to clamp the arms against the rim substantially as described and for the purpose set forth.

In testimony whereof I affix my signature.

LEON COMBRUN.

In presence of—
EMILE GRIMONT,
RICHARD BAYER.